United States Patent

Kristoff et al.

[11] Patent Number: 6,128,542
[45] Date of Patent: Oct. 3, 2000

[54] METHOD AND APPARATUS FOR GENERATING A SEQUENCE OF STEPS FOR USE BY A FACTORY

[75] Inventors: Paul R. Kristoff, Garland, Tex.; David P. Nunn, Memphis, Tenn.; Christopher Winemiller, Coppell, Tex.; Dennis L. Draheim, Plano, Tex.; John McCollum, Richardson, Tex.; Judith S. Hirsch, Plano, Tex.; John H. McGehee, Richardson, Tex.; Robert J. White, Jr., Lewisville, Tex.

[73] Assignee: CMSI Acquisition Corporation, Boulder, Colo.

[21] Appl. No.: 08/038,577
[22] Filed: Mar. 29, 1993
[51] Int. Cl.[7] .................................................. G06F 19/00
[52] U.S. Cl. .............................. 700/97; 700/121; 707/103
[58] Field of Search ......................... 395/140, 65, 155, 395/161; 700/86, 87, 121, 83, 84, 95, 97; 707/103, 104

[56] References Cited

U.S. PATENT DOCUMENTS

| 4,827,404 | 5/1989 | Barstow et al. | 364/192 |
| 4,868,785 | 9/1989 | Jordan et al. | 395/140 |
| 4,894,829 | 1/1990 | Monie et al. | 371/16.1 |
| 4,926,344 | 5/1990 | Collins et al. | 364/473 |
| 4,989,132 | 1/1991 | Mellender et al. | 364/200 |

*Primary Examiner*—William Grant
*Assistant Examiner*—Steven R. Garland
*Attorney, Agent, or Firm*—Mueller and Smith, LPA

[57] ABSTRACT

The present invention allows the produce or process engineering of a factory to define a sequence of steps and to associate the steps to various levels defined by the object oriented database OODB. This allows the steps to be variable name independent and allow increased flexibility in reusability of the step.

9 Claims, 3 Drawing Sheets

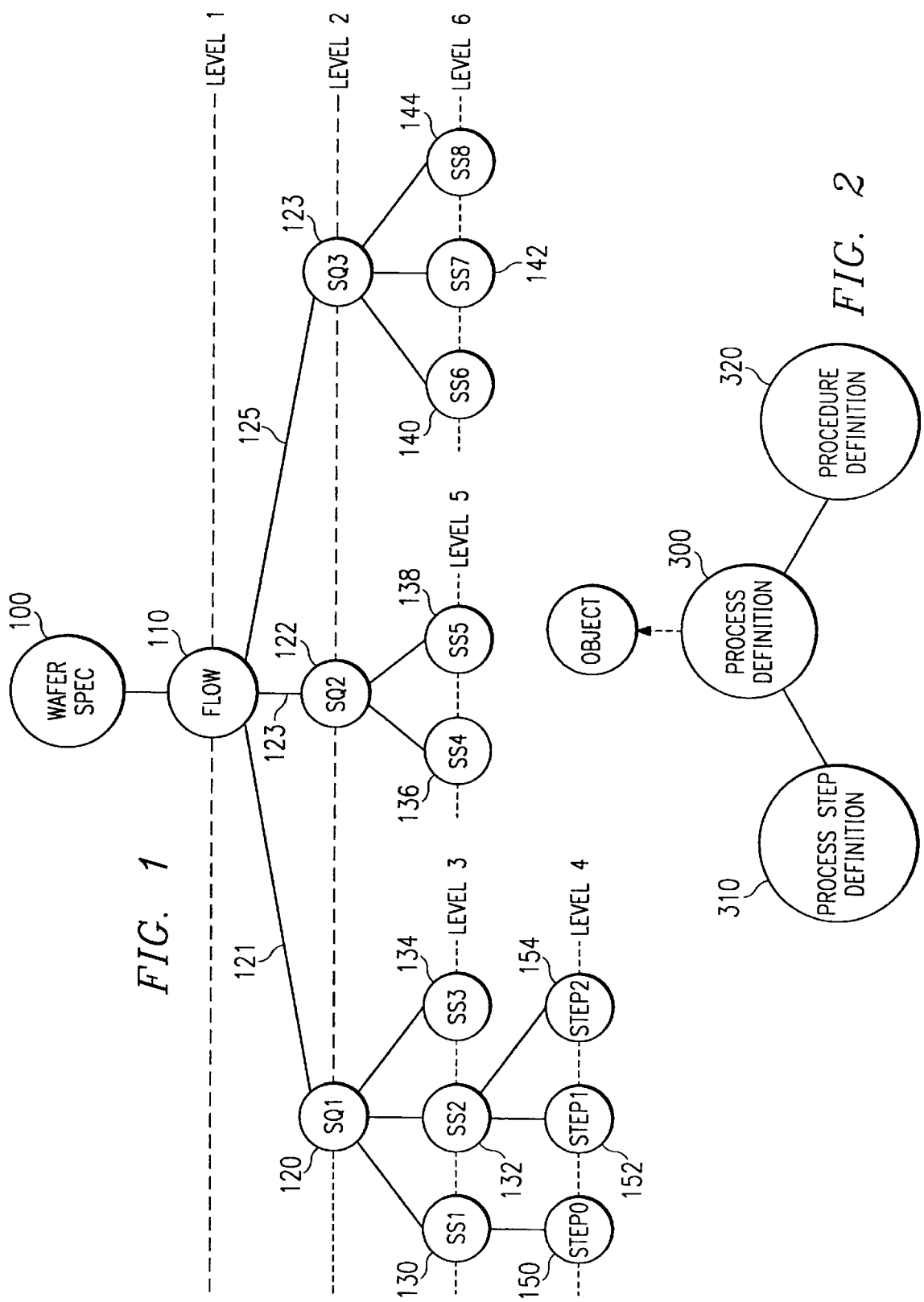

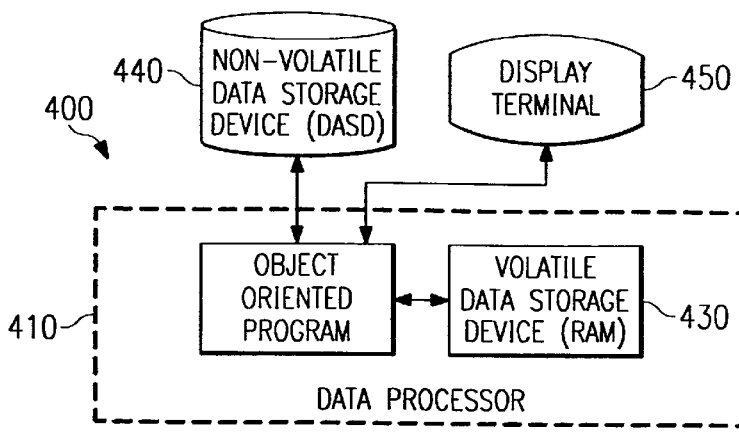
FIG. 3
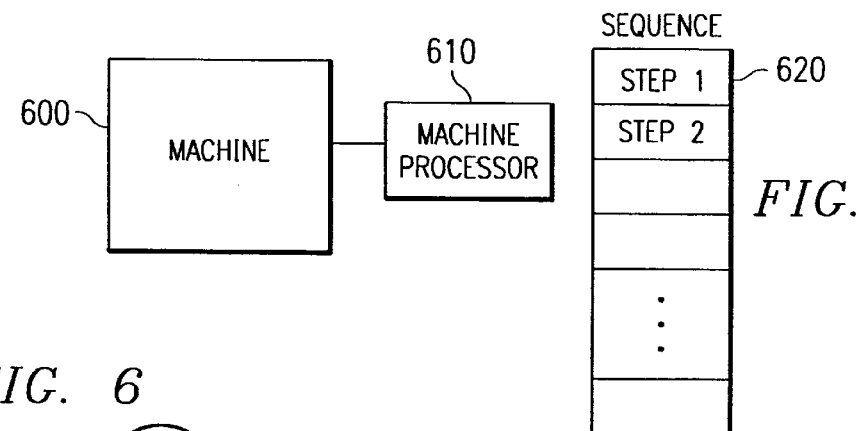
FIG. 4
FIG. 6
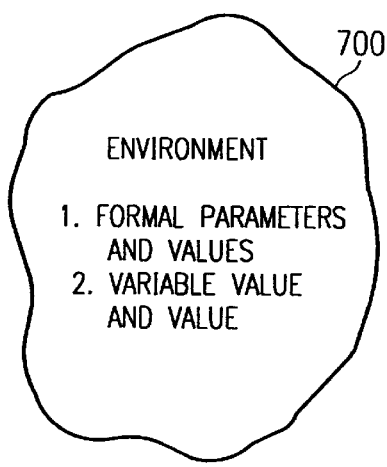
FIG. 7
FIG. 8
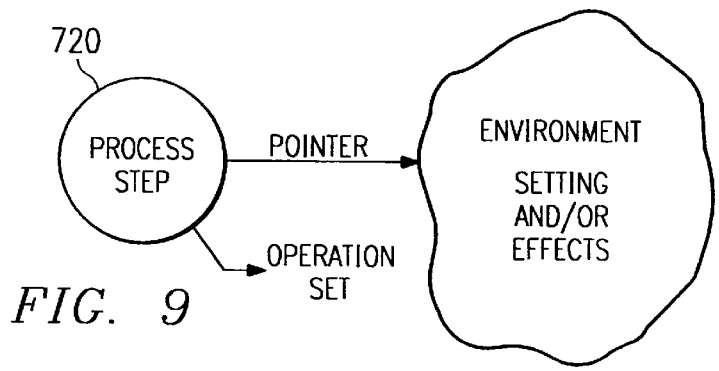
FIG. 9

METHOD AND APPARATUS FOR GENERATING A SEQUENCE OF STEPS FOR USE BY A FACTORY

The present application incorporates by reference herein the following pending U.S. applications: Ser. No. 08/040,303, filed Mar. 29, 1993, now abandoned, entitled "Computer-Aided Process Type Generic Classification Method"; and Ser. No. 08/039,719, filed Mar. 29, 1993, now abandoned, entitled "An Apparatus and Method for Effecting a Change Notice".

This invention was made with Government support under Contract No. F33615-88-C-544B awarded by the Defense Advanced Projects Research Agency (DARPA)/U.S. Air Force Wright Patterson Air Force Base and administered by U.S. Air Force. The Government has certain rights in this invention.

The following articles are incorporated by reference herein in their entirety:

"Programming Language Concepts", by Carlo Ghezzi, Mehdi Jazazei, published by John Wiley and Sons, 1982;

"Programming Languages Concept and Constructs", by Ravi Sethi, Addison-Weseley Publishing Company, 1989;

"Structure and Interpretation of Computer Programming", by Harold Abelson, Gerald Joy Sussppman and Julie Sussman, MIT Press, McGraw-Hill Book Company, 1985; and "IEEE Standards for the Scheme Programming Language", IEEE 1178, published by the IEEE, 1990.

TECHNICAL FIELD OF THE INVENTION

This invention relates to a method and apparatus for the generation of machine parameters, namely effects and setting, by generating machine independent steps by the application of modern programming technology to a manufacturing specification system.

BACKGROUND OF THE INVENTION

The current industry practice is for process specifications or steps to be equipment specific. The present semiconductor industry practice specifies that changes to be made to the wafer are in terms of the machine settings required to achieve the desired change in the wafer state or process. This requirement creates a processing specification that is very specific to the equipment that is to perform the process.

Computer programming utilizes Object-Oriented Databases (OODB). In an object-oriented system, data is stored in self-contained programmatic structures that also contain procedures for manipulating the data. The procedures need not reside in the same area of memory as the data or need not be routines specifying the procedures to be replicated in each object. Rather, the object may comprise only a set of pointers to data and procedural files that can be shared by many objects. Object-oriented programming systems may be employed as database management systems which are capable of operating upon a large database, and which are expandable and adaptable. In an Object-Oriented Database (OODB) Management System, the data in the database is organized and encapsulated in terms of objects with the instances of the objects being the data in the database. Similarly, the database manager may be organized as a set of objects with the database management operations being performed by sending messages from one object to another. The target object performs the requested actions on its attributes using its method.

In an object-oriented computing system, work is accomplished by sending action request messages to an object which contains (encapsulates) data. The object will perform the requested action on the data according to its predefined methods. The requestor of the action does not know what the actual data looks like or how the object manipulates it. The objects class defines the types and meanings of the data and the action requests messages that the object will honor. The individual objects containing data are called instances of the class. Classes generally relate to real-world things.

Referring to FIG. 3, a schematic block diagram of an OODB Management System (400) is illustrated. The system includes a data processor (410) which may be a mainframe computer, a mini-computer or a personal computer, a volatile data storage device (430), typically RAM for providing the working storage for active data, a display terminal (450) for interfacing the data processor with a user and intermediate results and a non-volatile data storage device (440). The object-oriented program is in the form of an OODB Manager.

In order to control a machine, a sequence of steps is generated. FIG. 4 illustrates a machine (600), a machine processor (610) connected to the machine (600) to input the sequence of steps (620). The sequence of steps (620) is read by the machine processor (610); the machine processor (610) translates the steps (620) into instructions for the machine (600). The instructions control the machine in such a manner that the machine operates to produce the product which the machine was designed to produce. For example, if a wafer is to be processed by the machine, the steps should define settings for the machine. These steps should be available to the machine when the wafer is to be produced, and, additionally, these steps need to be retained so that identical or substantially identical wafers can be produced at a later time. One way of generating this sequence would be to physically and individually code the sequence of steps and place these steps in a memory for access by the machine. Such a step generation process is time consuming in that there are a limited number of basic steps to be used in the sequence, such as etch, deposition or clean to produce the wafer, and such a step generation process is labor intensive. However, these limited number of steps are modified or individualized by the quantity of material used to implement these steps, the amount of time that these quantities of materials are applied to the wafer, or other variables to obtain the results of the step. As a consequence, these relatively small number of steps which are unique to a particular machine are applied to the above-described variables to result in a seemingly unlimited number of possible steps.

As the specification of the wafers change as a result of a different requirement, these steps are required to be changed or updated; the process engineer or product engineer is faced with another problem of identifying which particular steps correspond to a particular effect desired on the wafer. To aid in this change of the wafer specification, it would be helpful if conceptually, the production of a wafer could be viewed at various levels of wafer modification. For example, at higher level but not necessarily the highest level, the wafer modification or processing could be simply viewed as the production of the wafer; at a lower level, the wafer modification could be viewed as depositioning a layer or etching a layer on the wafer. At yet a lower level, the layer could be viewed as a specific portion of the layer to be changed.

Depending on the particular level the wafer modification or processing that is being viewed or analyzed, the number of the steps and the actual function of these steps may vary in accordance with that level.

The process engineer, at different times during the modification of the wafer, may desire to change the steps corresponding to a particular level. For instance, the process engineer may desire to change the thickness for the layer, or the process engineer may desire to deposit the same layer with a different material. One can readily see that a need exists for a specification that defines the steps in terms of the various levels where each of the levels define a very specific sequence of steps but affect the modification of the wafer differently.

However, as discussed above, each of the steps must be defined by unique values or parameters to achieve the goal of each step. These parameters are identified by names for example, and these parameters are generally common to and usable by all of the steps so as to provide the necessary uniqueness of each of the steps. However, common parameters cannot provide the steps with different values so that the step are unique.

Current factories or machines employ programming techniques that fail to solve the problems of providing a sequence including unique steps for the equipment. By using the same parameters in a given sequence of steps, the value of the parameter for one step will be the same as the value of the parameter for another step. One attempt to solve the above-mentioned problem is the use of a single global environment which is the mapping of variables to values. These values are referenced to a sequence of bits whose meaning is interpreted by the user, for example, a location in memory. These common parameters may not satisfy the need to uniquely define the steps by different parameters. The use of the global environment results in the variable having a single value and being a single memory location for all of the steps in the sequence.

This is an unacceptable solution because the process engineer may desire to repeat a previously-used step, but the process engineer is prevented from repeating the step by the fact that the variable of the step may require a different value. For example, Step 10 of the sequence may require a thickness of 10 while Step 200 of the sequence may require a thickness of 60.

An alternative to using common variables is using a different variable name for each step. If different variable names are used for the different steps, then the advantage of reusability of specific steps for a different aspects of the same sequence is lost, since each step must be individually coded with the different names or parameters to provide the different values required for the different steps. This solution becomes unworkable as the number of different steps becomes large, for example, how many variations exist for name thickness so that the user recognizes the variable name as being associated with thickness.

If the steps must be individually coded, the advantage of reusing these steps in a different part of the sequence is lost. Although the above description has employed a wafer and a wafer factory, the scope of the present invention is applicable to all types of equipment in any type of factory, as FIG. 4 illustrates.

OBJECT OF THE INVENTION

The object of the present invention is to provide a series of process step definitions, steps of a sequence, or instructions of the sequence that are executable by the equipment, for example, factory equipment or material. The present invention includes an algorithm for specifying the manufacturing process. The present invention improves the writeability or codeability of the specification in such a way that corresponds to the actual building or construction of the material, the readability of the specification in terms of the material hierarchy of the steps or the sequence of steps as implemented to follow the logic of the building of the material and the maintainability of the modification of the specification to reflect changes in the manufacturing environment.

The present invention recognizes that it is desirable to describe the production of the wafer in terms of levels, for example, level 1 which could be the highest level, level 2 which could be an intermediate level and level 3 which could be a lower level and the actual process of the material at these levels, for example, metal deposition, lithography and metal etch of a wafer, thus attempting to evaluate the actual steps.

The techniques employed by the present invention attempts to 'reproduce' the actual material process of the product or process engineer. When developing a sequence of steps, it is logical to think of the sequence at a high level and then at a lower level, translating these levels to individual steps. When the process is implemented, the determination of what is being created is facilitated without the necessity of looking at a large amount of detail.

Another object of the present invention is to increase the reusability of the specification. The present invention includes information hiding (encapsulation), for example, so that when the metal deposition step is required to be changed in only one step of the sequence, the step can be easily identified and the sequence updated without affecting the other steps of the sequence.

The present invention has the capability of allowing a process engineer to provide the sequence with steps which are easily repeatable and changeable within the sequence of steps to define an unlimited number of procedure calls which correspond to the sequence or steps, allowing more flexibility in changing the sequence or machine executable steps.

It is a further object of the invention to define individual effects and/or settings for each step of the sequence for factory equipment.

Thus, a further object of the invention is to provide different control effects or settings for each step of the sequence, avoiding the need of employing common variables with different names and different variables, allowing the control steps to be fully customized with respect to the effects or settings.

SUMMARY OF THE INVENTION

The present invention improves the writeability of specification, the readability of the specification and the maintainability of the specification. The present invention provides for an unlimited number of levels which could be defined by procedure calls, which can in turn define an unlimited number of bodies and which correspond to the desired sequence or steps. The present invention defines individual effects or settings for each step of the sequence of the factory equipment without the necessity of employing a number of different variable names which correspond to a single variable name while maintaining the reusability or repeatability of these steps within the sequence. Thus, the process engineer is able to precisely define the effects or settings for the sequence; for example, if a semiconductor or wafer equipment is employed, the process engineer can specify effects or settings so that the wafer is precisely produced in accordance with the desired effects and settings. With the present invention is there no limit on the number of levels of nesting in the sequences. The present invention permits the equipment to be independent of the process specification so that the specification can be changed in terms of physical terms. Thus, the present invention specifies the wafer state change in equipment independent form. This enables the creation of machine and facility independent specifications. The desired change to the wafer is specified in terms of the effects wafer such as the required thicknesses, uniformity, refractive index, etc.

These and other features of the invention that will be apparent to those skilled in the art from the following detailed description of the invention, taken together with the accompanying drawings.

DESCRIPTION OF THE DRAWINGS

FIG. 1 is a diagram of a specification showing the relationships between procedure bodies procedure calls and various levels;

FIG. 2 is a diagram showing the relationship between the process definition and the process step definition and the procedure definition as defined in the OODB;

FIG. 3 is a block diagram of a computer system;

FIG. 4 is a block diagram of the machine and machine processor;

FIGS. 6–8 are diagrams of environments;

FIG. 9 is a diagram of an environment and an operation set;

DETAILED DESCRIPTION OF THE INVENTION

Figure 5:
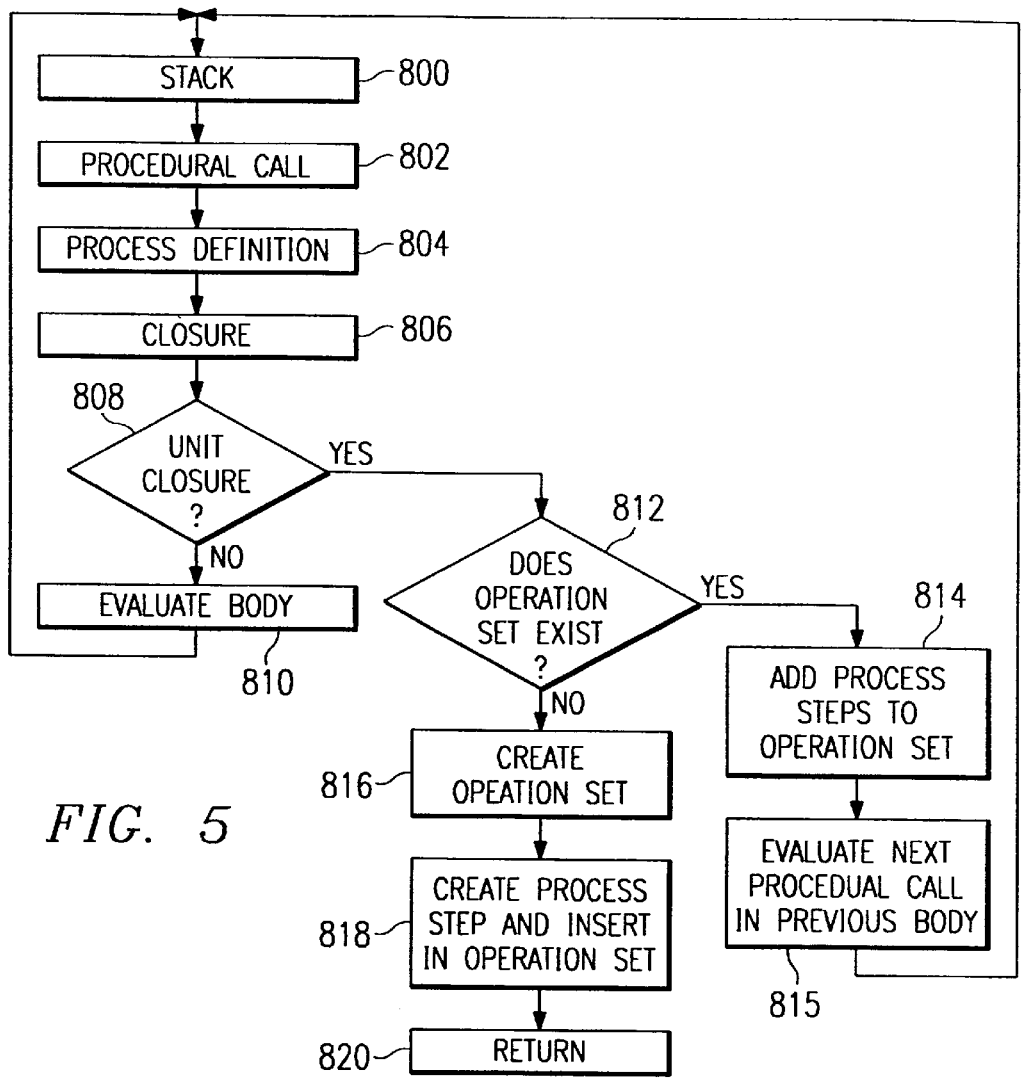
FIG. 5 is a flowchart of the present invention.

The present invention employs an OODB which, through the various levels of class and subclass, for example, by the hierarchy of the class and subclass, can represent the different levels of the sequence step. A series of procedure calls is employed to generate the sequence of steps and each of the procedure calls is associated with a procedure body that includes another series of procedure calls. Finally a series of process steps is produced such that the sequence of steps corresponds to each layer or different group of the procedure calls and, thus, each step maintains a correspondence with each level of the hierarchy. By judiciously selecting the procedure calls, each group of the procedure calls can be associated with a particular level of the production of the product. This level corresponds to actual aspects of the production of the wafer as defined by the steps of the sequence, each high level usually corresponds to a broader aspect of the production of the wafer, for example, the deposition of a layer. A given level which corresponds to a body of procedure calls corresponds to the same broad aspect of the production of the wafer as defined by the steps. Therefore, the procedural calls of that body correspond to the same aspect of the production of the wafer. For example, the first level of procedure calls forming a procedure body could correspond to the deposition of a layer; another set of procedure calls forming another procedure body and a second layer could correspond to the etching of that layer to a particular thickness, etc.

Additionally, the present invention permits effects control of the equipment while permitting the same parameter as represented by the parameter name to be used in different steps.

In order to produce an actual wafer, a series of steps or instructions are used or read by a particular machine and which comprise a sequence. These instructions or steps are used to instruct the machine in the inherit functions of the machine. Although the present invention describes a sequence of steps to produce a wafer as related to wafer producing machines, the present invention is equally applicable to all instruction-driven machines. These instructions may be modified before the machine reads and implements the instructions, and these instructions may be implemented by a human operator, etc.

A procedure call, for example (121, 123, 125) is an instance stored in the OODB and corresponds to a name that is associated with a procedure call, a particular step or sequence such as SQ1. Additionally, the procedure call corresponds to actual parameters which correspond to a name, for example, a thickness and a variable which could be a constant, for example, 3.142, or a variable, for example, x. The procedure call corresponds to an active version in the OODB. The procedure call passes the actual parameters to the environment.

A closure is associated with the process definition (300) and is another instance in the OODB. The closure is obtained from the process definition, and an argument which could be the actual parameters of the procedure call is applied to the closure. Formal parameters are associated with closure and are associated with a default name and value, for example, thickness and 500 ang. The closure uses the default values of the formal parameters unless these default values are overridden by the actual parameters of the procedure call.

As illustrated in FIG. 6, the evaluation of the closure additionally creates an environment (700). The formal parameters including the default value are placed in the environment and the actual parameter, and the values that were passed as arguments by the procedure call are placed in the environment (700). The formal parameters are matched with the actual parameters, for example, the formal parameter of the name, thickness, is matched with the actual parameter named thickness, and if the default value may be overridden, as defined by a flag or switch associated with the formal parameters, the actual value is replaced or is substituted for the default value. Thus, as illustrated in FIGS. 7 and 8, if a formal parameter associated with environment (700) is originally 30 ang; after the actual parameter with a value of 50 ang has been passed to the environment (700), the value in the environment (700) is changed to 50 ang.

A procedure body is an ordered collection of procedure calls, and the procedure calls are evaluated in the order that they are presented. As illustrated in FIG. 1, the procedure bodies SQ1 (120), SQ2 (130) and SQ3 (140) are executed in order, from the execution of SQ1, the procedure call to SS1 is obtained.

With the present invention, there is not just a single global environment, but an environment is created for each procedure body that is evaluated. As a consequence, there is at least one environment for each level.

In addition to a closure, the present invention includes a unit closure. This unit closure is comprised of formal parameters to create an object operation set. The unit closure, as with the above-description of the closure, evaluates the formal parameters and creates another environment. As with the closure, the formal default values are possibly overridden by the actual values. The operation set includes a pointer to the created environment of the unit closure and at least one process step that the machine processor (610) could execute. FIG. 9 illustrates the operation set (720) with the created environment by the unit closure. The environment of the unit closure includes the setting and effects of the machine. Thus, each process step has potentially unique settings and effects.

Figure 10:
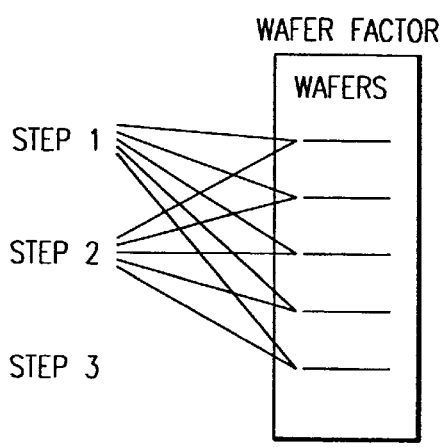
FIG. 10 is a diagram of a wafer executing a single step before another wafer executes the same step.
Figure 11:
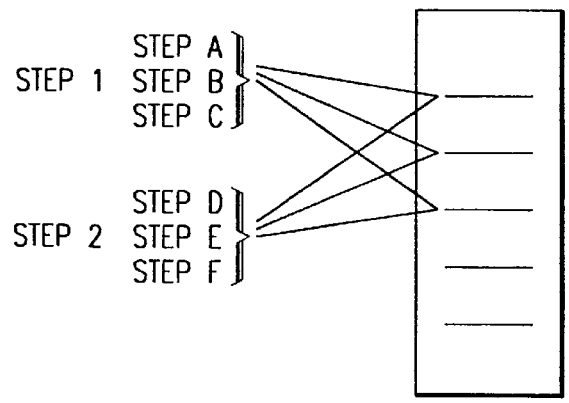
FIG. 11 is a diagram of each wafer executing a series of steps before another wafer executes these steps.

In a wafer factory, the individual wafer could be sequentially subjected to each individual steps, as shown in FIG. 10, or each wafer could be subject to the same sequence of steps as in FIG. 11 before another wafer is subject to the sequence of steps.

This is accomplished by a 'flag' in the closure such that if the flag is set, the entire sequence of process steps for every Step A, B, or C are subject to each wafer as a group of steps and ont individual before the step or subject to another wafer sequentially and is placed in one operation set. Otherwise, one process step is placed in the operation set. Each wafer is subject to the step or steps in the operation set.

With respect to variables, the present invention employs lexical scoping, and the scope of a variable is the range of program instructions over which the variable is known. Thus, a variable is visible within the scope of the variable and is invisible outside of the scope of the variable. With the present invention, the scope of the variable is limited to the environment of the associated closure. The closure of a procedure definition includes its procedure body.

The stack aspect of the present invention assures that the entire tree which is illustrated in FIG. 1 is traversed.

As illustrated in FIG. 5, the stacking step (800) assures that the entire tree of FIG. 1 is traversed or covered. As illustrated in Step 802, the procedure call is obtained from the body of the previous procedure call. The procedural call is evaluated to return the process definition either the process step definition or the procedure definition. The closure in Step 806 evaluates the procedure body of the procedure call by using the environment. In Step 808, the closure is further evaluated to determine if the closure is a unit closure. If the closure is not a unit closure, the body of the procedure call is evaluated in Step 810 to determine additional procedure calls to another level of the specification in Step 802.

However, if Step 808 is a unit closure, it is determined in Step 812 if an operation set previously exists. If the operation set does exist, the process steps resulting from the evaluation of the procedure call in the body are added to the operation set as in Step 814, and the next procedure call is evaluated from the previous body as in Step 815. However, in Step 812, if the operation set does not exist, the operation set is created in Step 816. In Step 818, the process steps are created and inserted into the operation set and the sequence stops in Step 820.

The instructions for processing a wafer are stored in wafer specifications. Each wafer specification has an instance variable 'flow' which will contain a procedure call specifying which process definition to use to process the wafer. As with all procedure calls, the process definition may be named specifically. Alternately, and even more likely, the procedure call may specify the use of 'active' revision of a document of process definitions. The procedure call may, of course, also specify actual parameters.

Following the procedure call to obtain the flow, the closure is obtained from the process definition (300) and arguments from the procedure call are applied to the closure. For example, the body of the process definition (300) includes an actual parameter x and a value 10 which are passed from the procedural call to the closure. The closure creates an environment having a formal parameter named x and a default value of 8. The name of the actual parameter must match with the name of the formal parameter. Since the argument overrides the default, the environment has a value of 10 for the variable x. This is a first level. The body additionally includes the procedure call to SQ1 (120), SQ2 (130) and SQ3 (140).

The procedure call to SQ1 is executed with arguments with a name of thickness and value of x. Since x must be resolved, it is resolved through the environment of the flow, namely 10.

Again, the closure of SQ1 is obtained from the process definition (300). The closure creates an environment having a default name of thickness and a default value of 100. Since the body from the process definition (300) includes arguments of the procedure call SQ1 and overrides the default value, the environment of SQ1 has a value of 10.

The body additionally includes the procedure calls SS1, SS2 and SS3, and defines another level. These are executed in order. The closure of SS1 is obtained from the process definition (300). The closure of SS1 creates an environment having formal parameters of a name of thickness and a default value of 100. The procedure call to SS1 does not include any arguments. Therefore, the environment of SS1 remains unchanged. The body from the process definition associated with SS1 does not include another procedure call, but does include a process step and creates yet another level, Step 0. The closure of Step 0 is obtained from the process definition (300). Since a step is obtained, the closure is a unit closure. The unit closure creates the environment with formal parameters, for example, a name of thickness and a default of 200. The arguments passed to the environment include an actual value of 50. The actual value overrides the default value. The unit closure also creates an operation set and places Step 4 within the operation set with a pointer to the environment. Thus, the step is ready for execution by the machine processor with a value of 50 for thickness, located with the environment of the step.

If a flag was set with the closure marking the closure as a unit closure, the closure could place a sequence of steps within the operation set of Step 0 such as Step A, Step B and Step C.

For example, if the process engineer realized that an additional layer had to be added to the wafer, the steps corresponding to this additional layer could be implemented by adding to the procedure calls SQ1, SQ2 and SQ3 by an additional procedural call, for example, SQ4, with body of flow (100). Additionally, the process engineer could easily identify the steps within the sequence that are associated with a specific process. With the present invention, the process engineer is not required to examine a long list of process steps or the entire sequence to determine which process steps are associated with a particular function such as deposition or etching. An additional advantage is the version of each procedure body can be changed so that different procedure calls can be implemented. This saves the process engineer the need for locating the steps and changing those steps.

Thus, a combined use of default parameters, passing parameters having an manifest value or a variable value are all employed to achieve the different goals for each of the steps is achieved.

Thus, by employing parameters and the concept of lexical scoping, the different steps have different values placed in their environments resulting in unique steps for execution by the machine. Assuming that the value of a particular step needs to be changed in order to create a different wafer or to improve the wafer under study, a different version in the OODB can be created. However, the particular parameter only need be changed, and this particular parameter can be easily identified by using a tree as described in FIG. 1. Thus, a long sequence of steps does not have to be evaluated in order to determine the location of a particular step in order to change the associated with parameter. The present invention allows wafer instructions to be modified easily and new wafers to be easily created from old wafer instructions.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method for generating a plurality of process steps to form a sequence of steps corresponding to a plurality of levels to operate a machine, comprising the steps of:

obtaining a pointer from a database corresponding to said sequence of said steps;

defining said sequence into at least two portions including a first portion and a second portion; and generating the process steps from said pointer so that the process steps include a first process step corresponding to first steps of said first portion of said two portions and not corresponding to second steps of said second portion of said two portions, and a second process step corresponding to said second steps of said second portion of said two portions and not corresponding to said first steps of said first portion of said sequence.

2. A method for generating a plurality of process steps to form a sequence as in claim 1, wherein the method further comprises the step of obtaining flow from said pointer.

3. A method for generating a plurality of process steps to form a sequence as in claim 2, wherein the method further comprises the step of obtaining a body corresponding to said flow.

4. A method for generating a plurality of process steps to form a sequence as in claim 3, wherein the method further comprises the step of obtaining a first procedure call and a second procedure call from said body, said first procedure call corresponding to said first portion and said second procedure call corresponding to said second portion.

5. A method for generating a plurality of process steps to form a sequence as in claim 4, wherein the method further comprises the step of obtaining an additional body from said first procedure call.

6. A method for generating a plurality of process steps for forming a sequence of steps corresponding to a plurality of levels to operate a machine, comprising the steps of:

obtain from a database a pointer corresponding to said sequence of the steps;

defining said sequence into at least two portions, including a first portion and a second portion; and generating the process steps from said pointer so that said first portion corresponds to a first step having a first parameter value and a first name and said second portion corresponds to a second step having a second parameter value and a second name, wherein said first name equals said second name and wherein said first parameter does not necessarily equal said second parameter.

7. A method for generating a plurality of process steps for forming a sequence as in claim 6, wherein said method further comprises the step of distributing said first and second parameter values to said steps in accordance with lexical scoping.

8. A method for generating a plurality of process steps for forming a sequence as in claim 7, wherein said method further comprises the step of overriding default values, wherein said first and second parameter values are propagated to said steps.

9. An apparatus for generating a plurality of process steps to form a sequence of steps corresponding to a plurality of levels to operate a machine, comprising:

circuitry for obtaining a pointer from a database corresponding to said sequence of the steps;

circuitry for defining the sequence into at least two portions including a first portion and a second portion; and circuitry for generating said process steps from said pointer so that said process steps include a first process step corresponding to first steps of said first portion of said two portions and not corresponding to second steps of said second portion of said two portions, and a second process step corresponding to said second steps of said second portion of said two portions and not corresponding to said first steps of said first portion of said sequence.

* * * * *